United States Patent [19]
Scheel et al.

[11] Patent Number: 5,503,064
[45] Date of Patent: Apr. 2, 1996

[54] APPARATUS AND METHOD FOR CONTROLLING A PASTEURIZING SYSTEM

[75] Inventors: Fredrick S. Scheel, Racine; Byron Bailey, Kenosha; William D. Scheel, Racine, all of Wis.

[73] Assignee: Custom Control Products, Inc., Racine, Wis.

[21] Appl. No.: 298,783

[22] Filed: Aug. 31, 1994

[51] Int. Cl.$^6$ .............................. A23L 3/00; A23C 3/00; A23C 9/00
[52] U.S. Cl. .................. 99/453; 99/468; 99/483; 422/117; 422/119; 364/500; 364/510
[58] Field of Search .................. 99/452, 453, 455, 99/467, 468, 470, 483, 485, 486, 492, 516; 422/117, 119, 20; 364/500, 510, 580, 148, 188; 251/369; 426/520, 521, 522; 137/101.19

[56] References Cited

U.S. PATENT DOCUMENTS

| | | | |
|---|---|---|---|
| 3,535,517 | 10/1970 | Eason . | |
| 4,254,460 | 3/1981 | Echter | 364/104 |
| 4,309,381 | 1/1982 | Chamberlain et al. | 422/3 |
| 4,310,476 | 1/1982 | Nahra et al. | 99/453 |
| 4,387,422 | 6/1983 | Steutermann | 364/183 |
| 4,416,194 | 11/1983 | Kemp | 99/453 |
| 4,583,453 | 4/1986 | Torterotot | 99/453 |
| 4,592,896 | 6/1986 | Runnells et al. | 422/109 |
| 4,779,186 | 10/1988 | Handke et al. | 137/101.19 |
| 4,801,466 | 1/1989 | Clyne et al. | 426/232 |
| 4,861,559 | 8/1989 | Sugisawa et al. | 422/110 |
| 4,876,653 | 10/1989 | McSpadden et al. | 137/101.19 |
| 4,926,747 | 5/1990 | Hashimoto | 99/486 |
| 4,975,246 | 12/1990 | Charm | 422/21 |
| 5,054,385 | 10/1991 | Scheel et al. | 99/453 |
| 5,132,084 | 7/1992 | Harrell | 422/26 |
| 5,147,610 | 9/1992 | Watanabe et al. | 422/64 |
| 5,227,875 | 1/1994 | Albright et al. | 422/109 |

Primary Examiner—David Scherbel
Assistant Examiner—Reginald L. Alexander
Attorney, Agent, or Firm—Jansson & Shupe, Ltd.

[57] ABSTRACT

The disclosure relates to an apparatus and method for controlling a system used to pasteurize food products such as milk, orange juice and raw eggs. Such system has components including at least one product tank, a pump for flowing a product through the system, a flow diversion device and a heat exchanger. The apparatus has a programmable logic controller linked to at least one component and also includes a display panel having (a) a depiction relating to one of the components, and (b) an input device such as a touch-pad type pushbutton connected to the controller for controlling a component. There are several depictions displayed in sequence and when a depiction is displayed, the input device associated therewith is also displayed and may then be actuated. After pasteurization, a batch report is printed. Vitamin injection is optionally available.

25 Claims, 10 Drawing Sheets

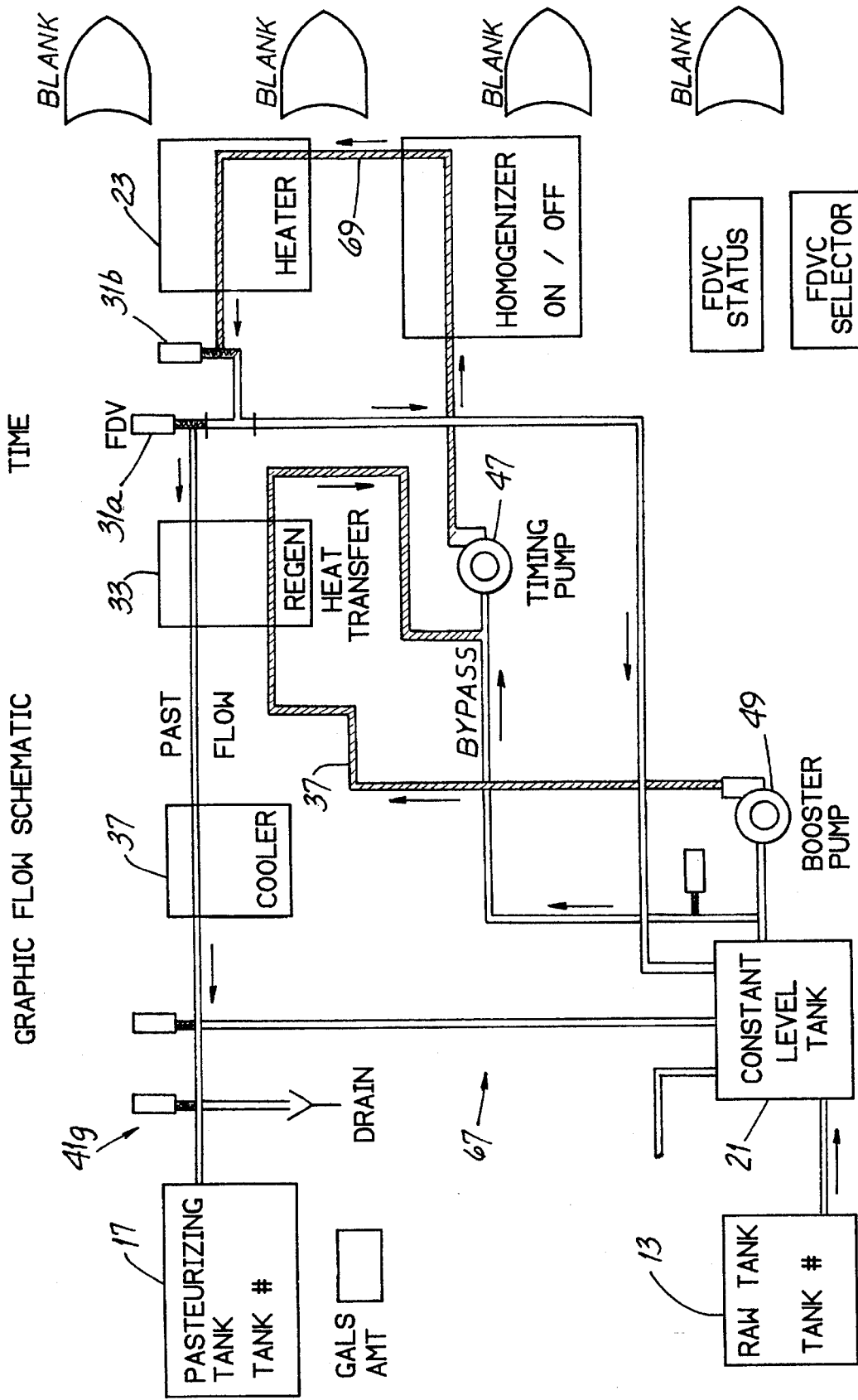

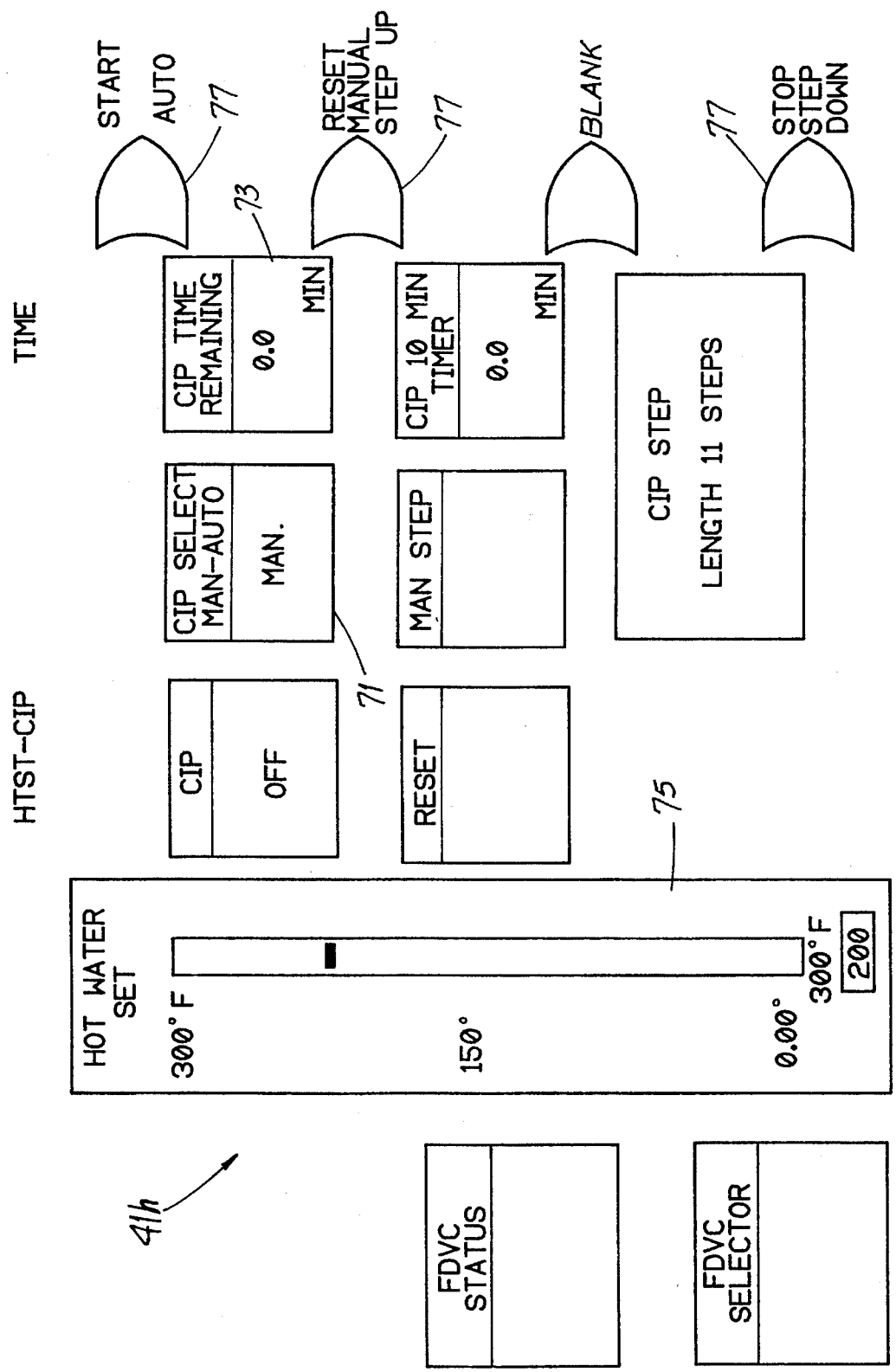

APPARATUS AND METHOD FOR CONTROLLING A PASTEURIZING SYSTEM

FIELD OF THE INVENTION

This invention relates to process systems and, more particularly, to systems for processing liquid or semi-liquid products.

BACKGROUND OF THE INVENTION

Systems for pasteurizing liquids, e.g., raw milk, are widely used through the world. Such systems help assure that milk suitable for human consumption, sold as "Grade A" milk in the United States, has been processed in a particular way to achieve pasteurization. The Milk Safety Branch of the U.S. Food and Drug Administration (FDA) has established standards governing the construction and operation of such systems. Such standards are extremely strict and well enforced by a network of regulatory officials. In fact, most milk producers are well aware of the problems that might arise from selling tainted milk and carefully adhere to such standards in operating pasteurizing systems.

That such standards are highly effective in protecting the public health is evidenced by the fact that at least in the U.S., milk-borne diseases are all but unknown. And other milk-producing countries recognize the efficacy of the FDA standards to such an extent that they have become de facto international standards widely adhered to outside the U.S.

Modern pasteurizing systems are of the type known as high temperature short time (HTST) systems. In such systems, the product being pasteurized, e.g., milk, is maintained at the relatively high temperature of about 162° F. for a minimum of about 16–17 seconds. Milk which has been subjected to such process is known as pasteurized milk.

Such pasteurizing systems may be broadly divided into two portions, namely, handling and treating equipment and pasteurizing control apparatus. The former includes among other components, holding tanks and piping which flow milk to heating devices where pasteurization occurs. The latter includes a flow diversion valve which receives milk from the handling and treating equipment. Under certain predetermined, precisely-defined circumstances which evidence that pasteurization has occurred, such flow diversion valve is controlled to direct milk into a receiving tank for later placement into containers for sale. If pasteurization has not occurred of if, for example, pasteurized milk is to be drawn off for inspection rather than sale, the flow diversion valve is controlled to direct milk through piping other than that to the receiving tank, for example, if pasteurization has not occurred, milk is usually "recycled" back into a tank for re-processing.

The importance of a properly-controlled flow diversion valve means cannot be overstated. That is, the integrity of the valve controller is a fundamental determinant as to whether the milk sold to the public is pasteurized. In fact, controllers used with such flow diversion valves are often called "public health controls" for obvious reasons.

While the flow diversion valve is important (as is proper operation thereof), a typical system for processing a food product such as milk has a number of other components which must be controlled or at least selected for the system to work properly. For example, there may be one or plural tanks for holding raw milk awaiting pasteurization, a constant level tank, pumps, a homogenizer, a heat exchanger, a cooler and more or plural tanks for holding the milk pasteurized by the system and awaiting containerization. One of plural holding tanks and/or one of plural pasteurized milk tanks has to be selected and all of these components are connected together by pipes to form the pasteurizing system.

Until the advent of the invention, only the flow diversion valve was coupled to any kind of an apparatus which could provide automatic control. Such a control apparatus for a flow diversion valve is the subject of U.S. Pat. No. 5,054,385 (Scheel et al.) which is assigned to the assignee of the instant invention.

And until the advent of the invention, the system components other than the flow diversion valve were controlled by diverse devices, the operations of which were cooperatively "integrated" only by the ingenuity and know-how of the people (usually dairy personnel) operating them. The fact that milk-borne diseases are all but unknown in the United States is a tribute to the capabilities of such personnel and to the reliability of the system components.

But there are disadvantages to the apparatus used to operate such systems. For example, when "setting up" a system to pasteurize a product, there are a substantial number of choices to be made by the operator. S/he must select the desired tanks (if the system has plural tanks of either type) and also select such things as system operating mode (e.g., recycle, drain, discharge), batch size, the product to be processed (e.g., yogurt liquid, whole milk, ½% milk) and heat exchanger water temperature. Pumps to flow milk through the system must also be actuated.

And that is not all. Pasteurizing systems are often arranged to be "cleaned in place." A clean-in-place (CIP) operation involves purging the system of milk product and flowing very hot water through the system to sterilize it. CIP operation presents yet additional choices to be made by the operator. The array of choices can be baffling and mistakes during system setup and process initiation are not unheard of. Existing control apparatus simply does not organize and is incapable of organizing the setup tasks in a highly coherent way.

Still another disadvantage of known control apparatus is that there is no convenient means for report generation. It is highly desirable to keep records on a number of aspects of the pasteurizing process and the product resulting therefrom. Typically, such records are created manually and are subject to error, perhaps even falsification.

Yet another disadvantage of known control apparatus (as well as of the pasteurizing systems controlled by them) relates to the production of milk or milk products having reduced butterfat content. Since many of the vitamins in milk are present in the butterfat, the removal of such butterfat (to make skim milk, for example) also removes vitamins. Such vitamins are required to be added back in to the final product and milk with vitamins added is said to be "fortified." Current "technology" for fortifying milk is by a container (e.g., a pail) of vitamin solution poured into the appropriate tank. The mixing ratio is less than precise.

An improved apparatus and method which addresses the aforementioned disadvantages would be an important advance in the art.

OBJECTS OF THE INVENTION

It is an object of the invention to provide a new apparatus and method for controlling a pasteurizing system which overcomes some of the problems and shortcomings of the prior art.

Another object of the invention is to provide a new apparatus and method for controlling a pasteurizing system which "prompts" the operator through a coherent, orderly setup and initiation of such system.

Another object of the invention is to provide a new apparatus and method for controlling a pasteurizing system which provides for report generation.

Yet another object of the invention is to provide a new apparatus and method for controlling a pasteurizing system which adds vitamin solution to a milk product in a precise ration of solution to product.

Still another object of the invention is to provide a new apparatus and method for controlling a pasteurizing system which "integrates" the system control function. How these and other objects are accomplished will become apparent from the following descriptions and from the drawing.

SUMMARY OF THE INVENTION

The invention relates to an apparatus for controlling a system used to pasteurize a liquid or semi-liquid food product such as milk or raw eggs. The system has a number of interconnected components including at least one product tank, a pump for flowing a product through the system, a flow diversion device and a heat exchanger. The new apparatus includes a programmable logic controller linked to at least one component, e.g., the flow diversion device, and an operator's display screen. Each panel displayed on the screen has (a) a depiction (a symbol, "window" or the like) relating to one of the components, and (b) an input device (such as a button or button-like touch pad) connected to the controller for controlling the component which is the subject of the depiction. To put it another way, each panel "ties together" a component and one or more operator-manipulated buttons or function keys relating to such component.

Several examples will help illustrate this feature. The heat exchanger is heated by a hot liquid which flows through the heat exchanger and constitutes the "medium" which transfer the heat used to pasteurize. One depiction relates to the heat exchanger and includes the setpoint temperature of the liquid as well as a button for selecting the setpoint temperature. As another example, the controller is linked to the pump which has identifying nomenclature associated therewith, e.g., timing pump, booster pump or the like, and the panel displays the nomenclature.

If a milk product is to be pasteurized by the system, such product is selected from a group of milk products including skim milk, whole milk, 2% milk and the like. The panel displays identifying nomenclature for each of the products in the group so that a specific product may be selected.

Similarly, the system includes plural product tanks, e.g., raw product tanks and/or discharge tanks, the latter for receiving the pasteurized product. The panel displays identifying nomenclature for the tanks to permit tank selection.

In another aspect of the invention, the pump is a timing pump and the milk product is pasteurized in a batch of, say, 2000 gallons, 16,000 pounds or the like. The input device related to batch size selection controls operation of the timing pump to select the size of the batch.

And the new apparatus is very easy to use. One depiction relates to plural components and constitutes a piping diagram of the system. Such diagram includes representations of each of the major pipes interconnecting components and through which product flows. The pipes through which product is flowing are visually emphasized in the depiction so that the operator can see whether the intended operation is actually occurring.

A preceding part of the specification describes the flow diversion device and its importance in the overall operation of the system. Such flow diversion device may be at either of two positions, i e., "divert" or "forward." With the device in the "divert" position, the product is "looped back" to the input side of the system and recycled through the heat exchanger. With the device in the "forward" position, the pasteurized product is routed toward a discharge tank. In a preferred apparatus, the panel also displays the position of the flow diversion device and in a highly preferred embodiment, several depictions display such position.

And that is not all. The new apparatus also has a feature which largely eliminates the tedium and greater opportunity for inaccuracy attending manual recordkeeping. The new apparatus also includes a batch report printer coupled to the logic controller. When the entirety of a batch has been processed (as signalled by a totalizer), a report on that batch is automatically printed.

The new apparatus also has a feature eliminating the need to manually add vitamin solution to tanks of milk product. Such apparatus includes at least one vitamin solution dispenser coupled to the controller. When the panel depicts the products from which a product selection is made, e.g., 2% milk to be pasteurized, such panel also depicts a pad for actuating the dispenser. Thereafter, such dispenser "injects" vitamins into the milk product at a rate automatically selected in view of the particular milk product selected.

The invention also involves a method for controlling a system used to pasteurize food products. Such method includes the steps of displaying a depiction relating to a component and operating an input device controlling the component of the depiction. In a more specific aspect, such method also includes the steps of pasteurizing a batch of a food product and printing a report relating to the batch. As noted above, the printing step is automatically initiated by the conclusion of the pasteurizing step.

It is preferred that a pasteurizing system be operated only by skilled persons trained in its use. The new method helps assure that result. The pasteurizing step includes entering a "password" unique to a particular person and the operator of the food product pasteurizing facility will take steps to assure that only properly trained persons are accorded a password. The printing step includes printing nomenclature identifying the person whose password has been entered.

In a preferred method, several system or product-related depictions are displayed in sequence. That is, first, second, third and fourth depictions are displayed in sequence and first, second, third and fourth input devices are sequentially selected. Most preferably, each depiction also includes an input device related to that particular depiction.

For example, the first depiction may be related to the heat exchanger and depict a temperature bar graph along with one or more input devices for selecting a temperature setpoint for the liquid used to supply heat to the heat exchanger. As another example, another depiction may display identifying nomenclature for each of the array of milk products which can be pasteurized in that system. Such depiction will also include one or more input devices for selecting (by nomenclature) a particular product to flow through the system.

As yet other examples, another depiction may include identifying nomenclature for the tanks, e.g., raw milk tank #1, and the operating step includes operating the third input device to select a tank. Yet another depiction relates to batch size and the operating step includes operating another input device (a device appearing on the batch size depiction) to select the size of the batch.

Other details of the new apparatus and method will be set forth in the following detailed description and in the drawing.

BRIEF DESCRIPTION OF THE DRAWING

FIG. 1 is a pictorial representation of the improved control apparatus shown in conjunction with a system for pasteurizing liquid and semi-liquid food products such as milk, milk-based products, juice, raw eggs and the like.

FIG. 9 is a panel displayed on the apparatus screen and a graphic flow schematic or piping diagram of the pasteurizing system.

FIG. 10 is a panel displayed on the apparatus screen and relating to the "clean-in-place" procedure for sterilizing the pasteurizing system.

DETAILED DESCRIPTION OF PREFERRED EMBODIMENTS

Before describing the embodiments, some terms will be defined. As used in this specification, the term "food product" means liquid or semi-liquid food products including milk and milk-based products, the latter exemplified by ice cream mix and yogurt mix. Such term also means orange juice and raw eggs. The term "milk" or "milk product" means skim milk and milk in any butterfat concentration.

The embodiments of the new apparatus 10 and method will be better appreciated by first having an understanding of a typical liquid or semi-liquid food product pasteurizing system 11. Preponderantly, such system 11 is used for milk pasteurizing and is described for such use.

Figure 1:
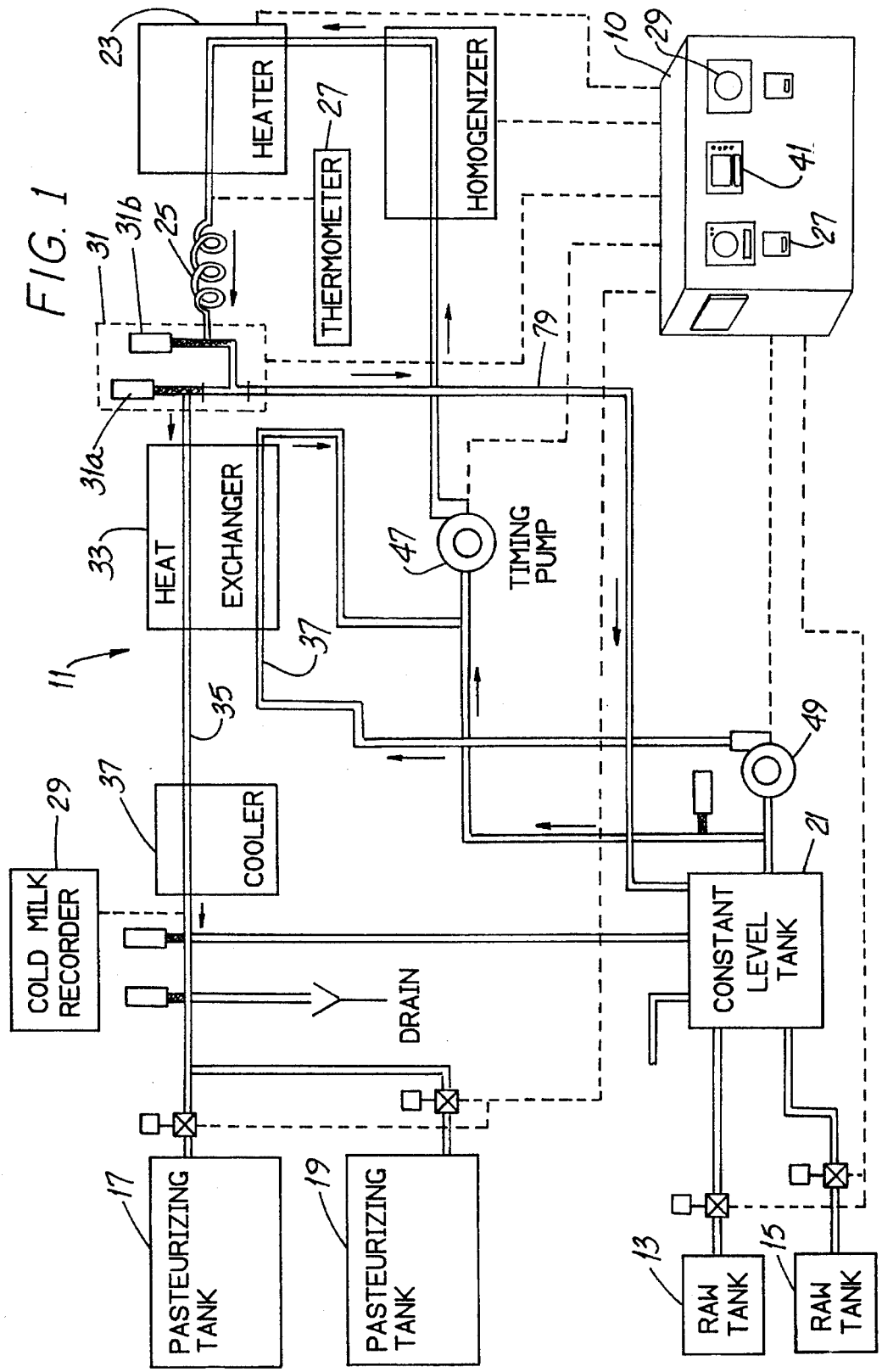

Referring to FIG. 1 the improved apparatus 10 is shown in conjunction with a pasteurizing system 11 which, per se, is known. The system 11 is known as a high temperature short time (HTST) system because of the way pasteurization occurs in it. Such system 11 includes bulk storage tanks 13, 15 for raw milk and a tanks 17, 19 for storing milk pasteurized by the system 11. Raw milk is delivered into a balance tank 21 and from thence is delivered to a milk heater 23 where it is brought to pasteurizing temperature. From the heater 23, it flows to the holding tube 25 where it "dwells" for the prescribed time, nominally 16–17 seconds or perhaps slightly longer. An indicating thermometer 27 displays the temperature of the milk flowing from the tube 25 and a temperature recorder 29 records such temperature.

Assuming the temperature of milk flowing from the tube 25 is as specified, the flow diversion valve or device 31 (two separate valves 31a, 31b in a common assembly) permits milk to flow through a heat exchanger 33 and along the pipe 35 where heat from the now-pasteurized milk is transferred (without milk intermingling) to raw incoming milk flowing along the pipe 37. From the heat exchanger 33, the pasteurized milk flows through a cooler 37 and thence to one of the tanks 17, 19 for storage at a temperature only a few degrees above freezing.

Figure 2:
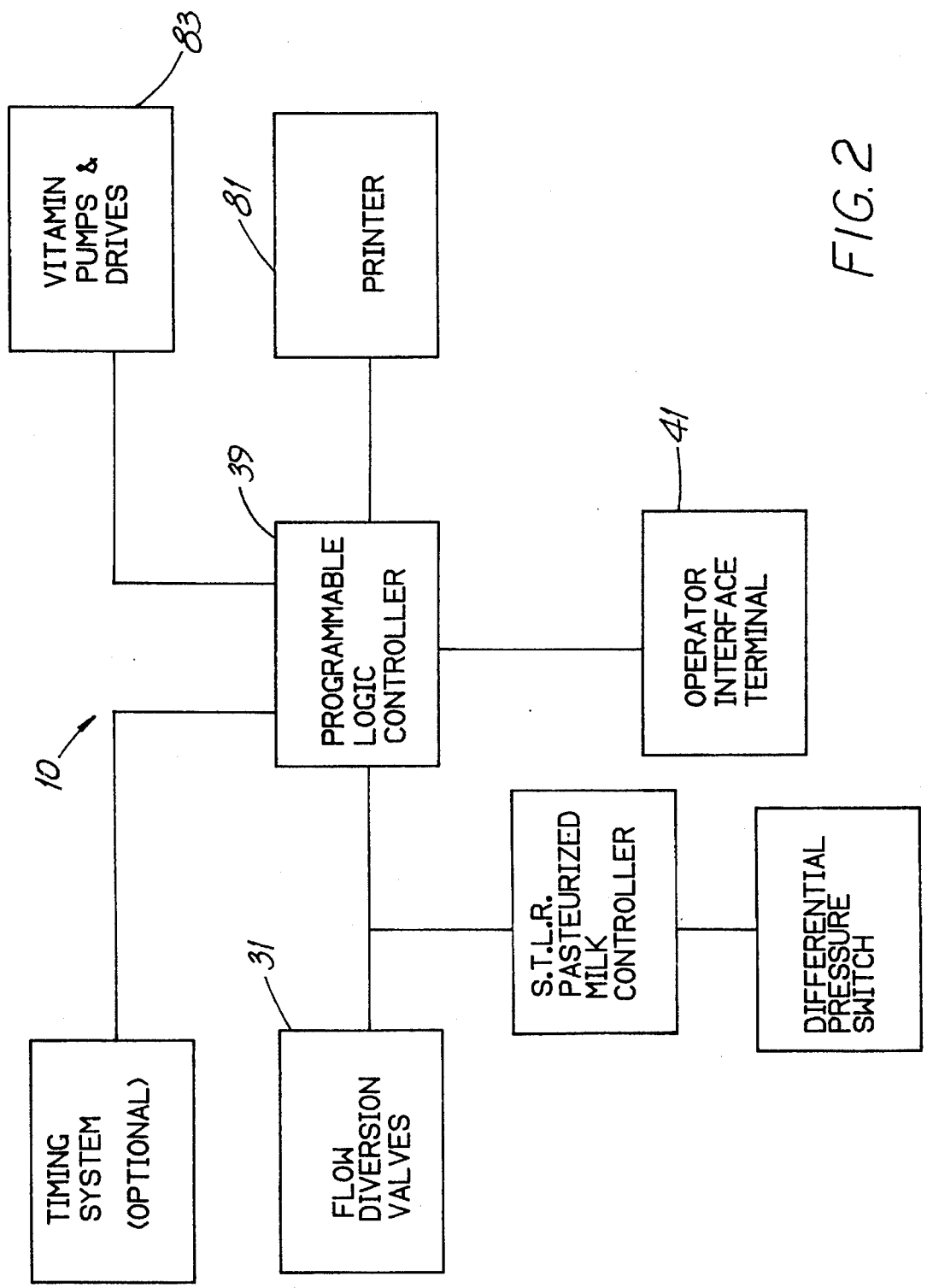
FIG. 2 is a block diagram of the improved control apparatus depicted in FIG. 1.

Referring also to FIG. 2, the new apparatus 10 includes a programmable logic controller 39 linked to at least one component, e.g., the flow diversion device 31, and also includes an operator's display screen 41. In this specification, the screen is identified generally by numeral 41 while the individual display "panels" depicted in FIGS. 3–10, inclusive, (and which appear one-by-one on the screen 41) are identified as 41a through 41h, respectively.

In general, each panel 41–41h has (a) a depiction relating to one of the components, and (b) an input device (such as a button or button-like touch pad) connected to the apparatus 10 for controlling the component which is the subject of the depiction. To put it another way, each panel 41a–41h "ties together" a component and one or more operator-manipulated buttons relating to such component. (For clarity, where a component is shown in FIGS. 1 or 2 and is also represented in one of the panels 41a–41h discussed below, the same identifying numeral is used for both.)

Figure 3:
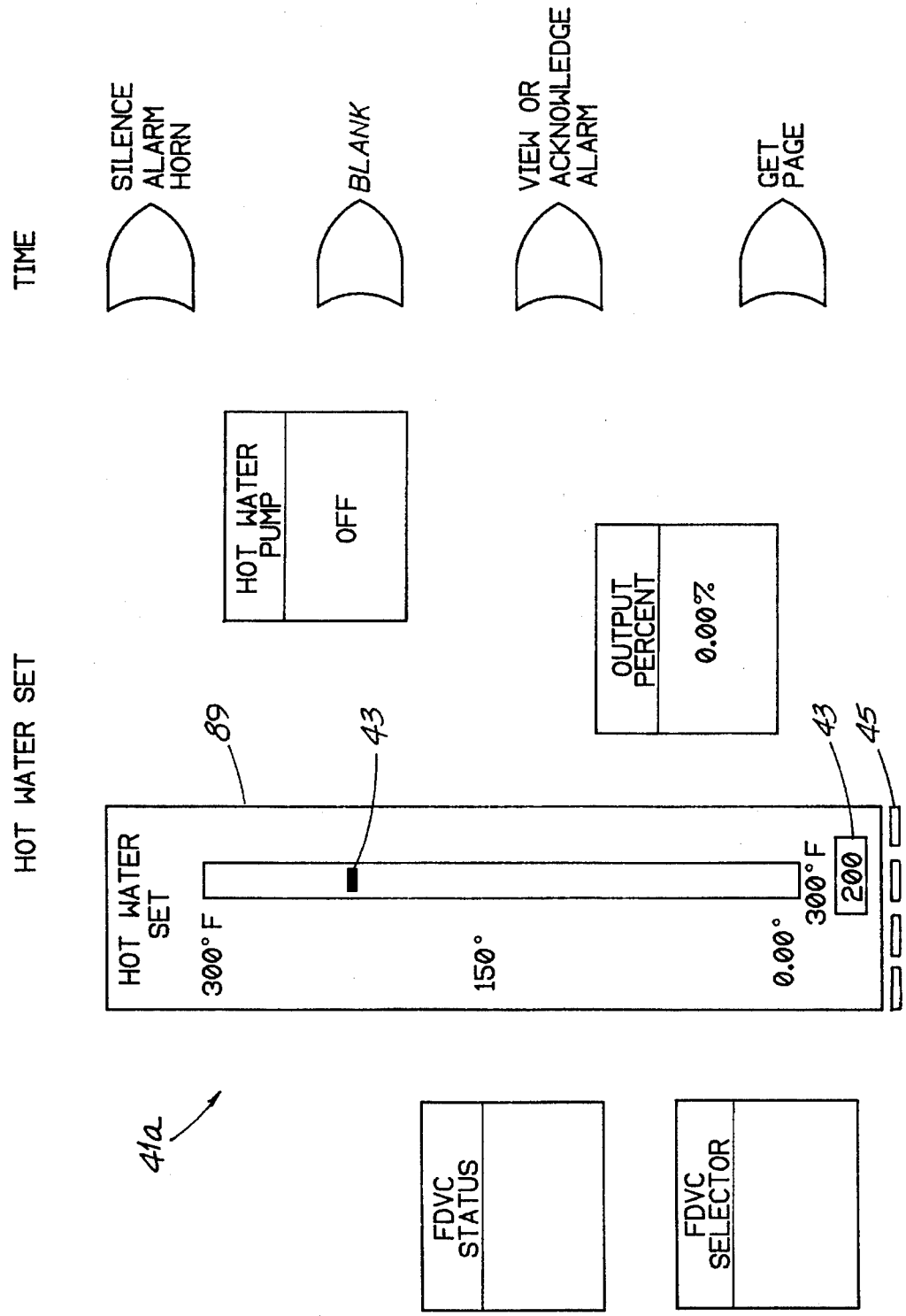
FIG. 3 is a panel displayed on the apparatus screen and relating to heat exchanger operation.

Several examples will help illustrate this feature. Referring particularly to FIGS. 1 and 3, the heat exchanger 33 is heated by a hot liquid which flows through the heat exchanger 33 and which constitutes the "medium" transferring the heat of pasteurization to the milk. The panel 41a relates to the heat exchanger 33 and includes the setpoint temperature 43 of the liquid (displayed both graphically and numerically) as well as a key or button 45 for selecting the setpoint temperature.

Figure 4:
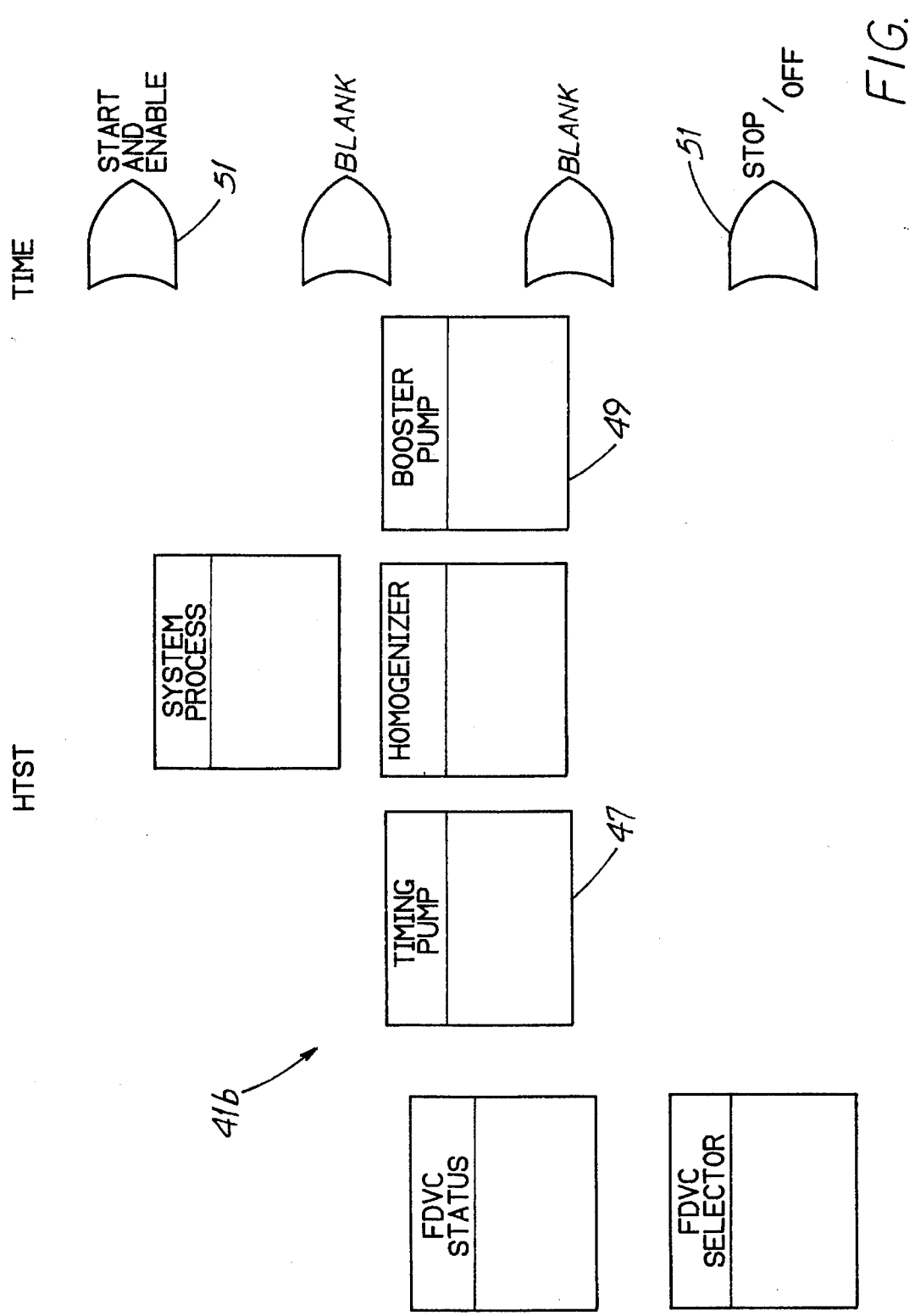
FIG. 4 is a panel displayed on the apparatus screen and relating to system initiation.

Another example is shown in the panel 41b of FIG. 4. The apparatus 10 is linked to the pump which has identifying nomenclature associated therewith, e.g., the timing pump 47, the booster pump 49 or the like, and the panel 41b displays the nomenclature and also displays a button 51 for controlling the pump.

Figure 5:
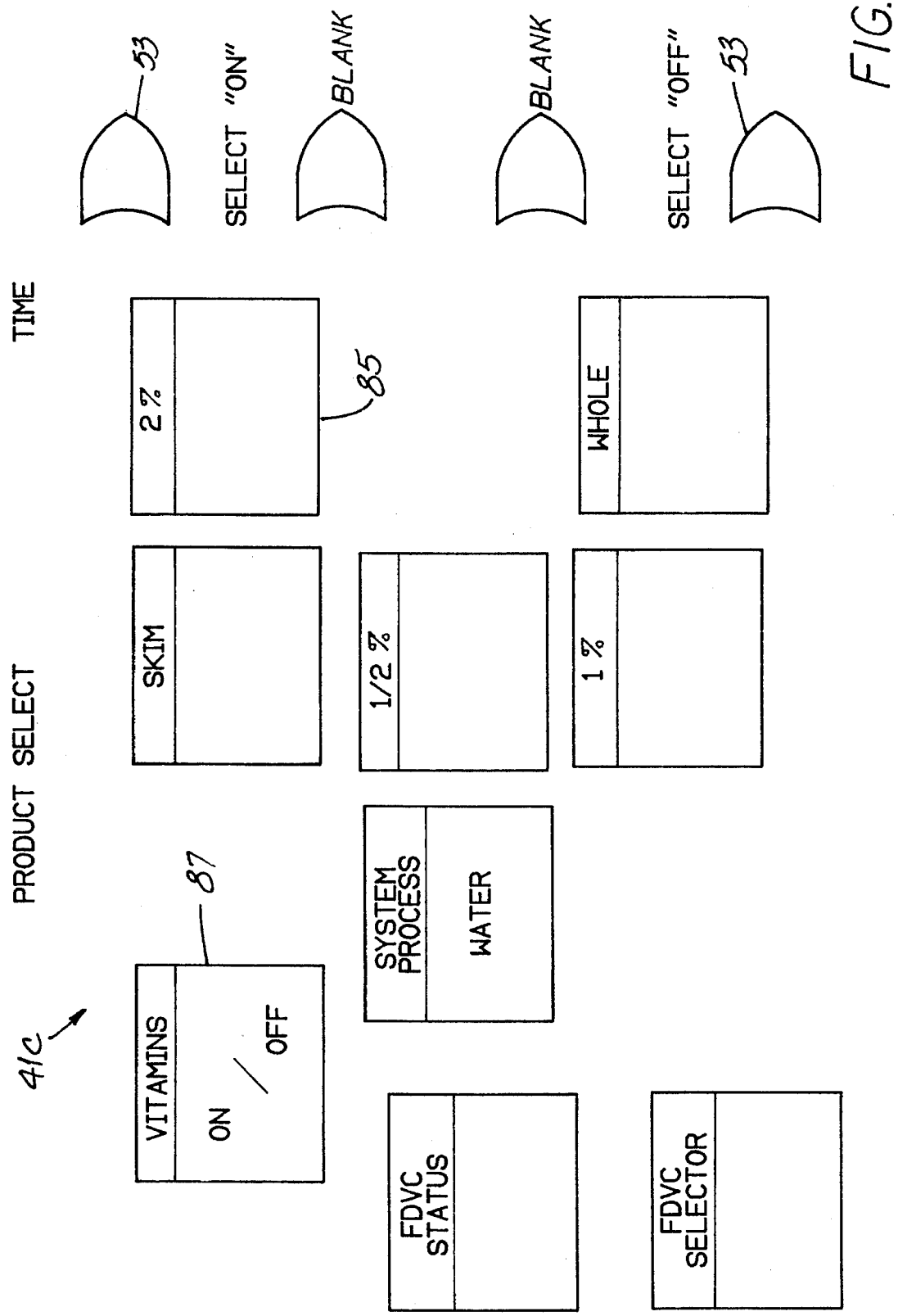
FIG. 5 is a panel displayed on the apparatus screen and relating to the product to be pasteurized.

Referring also to FIG. 5, if a milk product is to be pasteurized by the system 11, such product is selected from a group of milk products including skim milk, whole milk, 2% milk and the like. The panel 41c displays identifying nomenclature for each of the products in the group so that a specific product may be selected using the function keys 53 which appear on that panel 41c.

Figure 6:
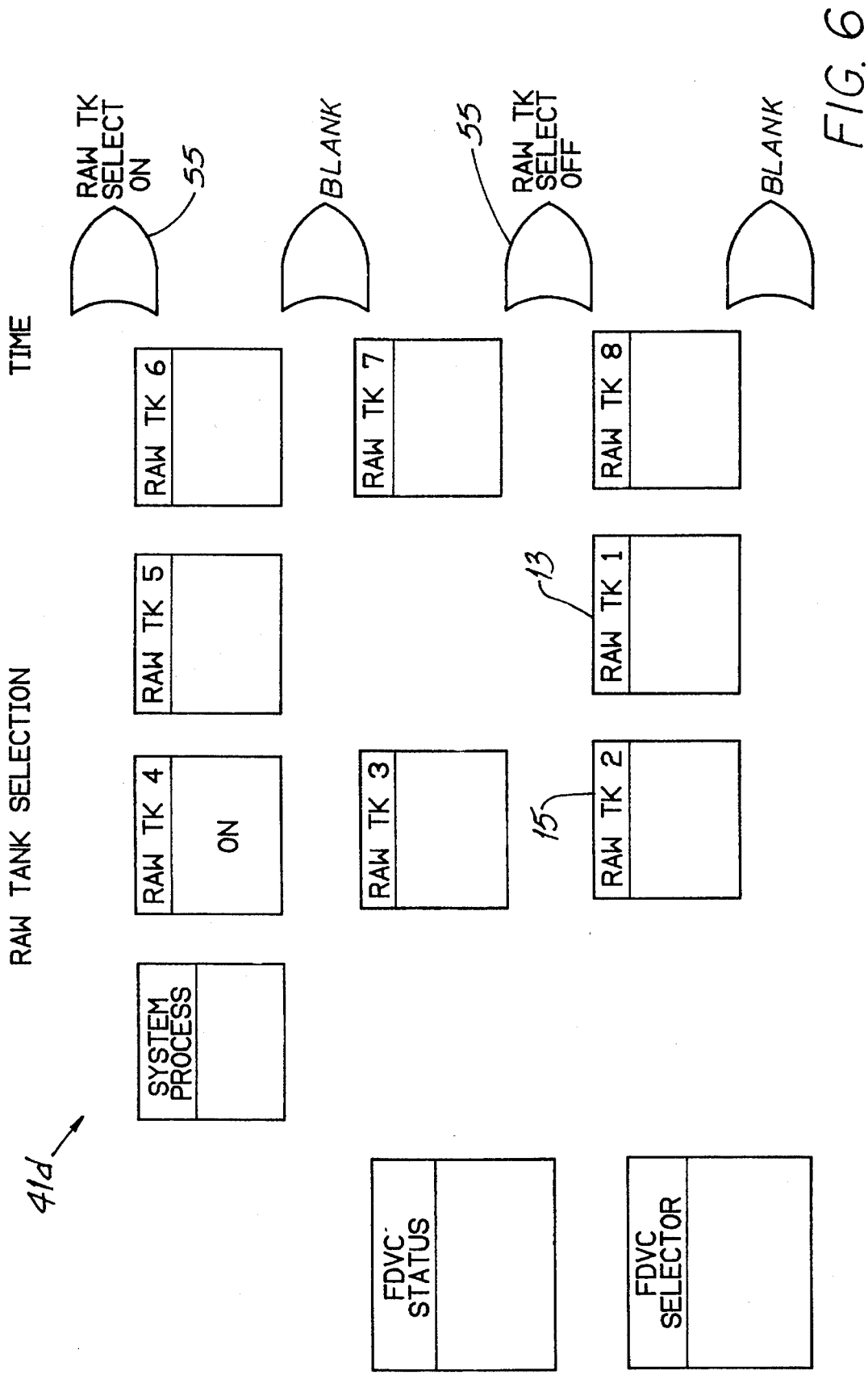
FIG. 6 is a panel displayed on the apparatus screen and relating to selection of the tank from which raw milk is drawn for pasteurization.
Figure 7:
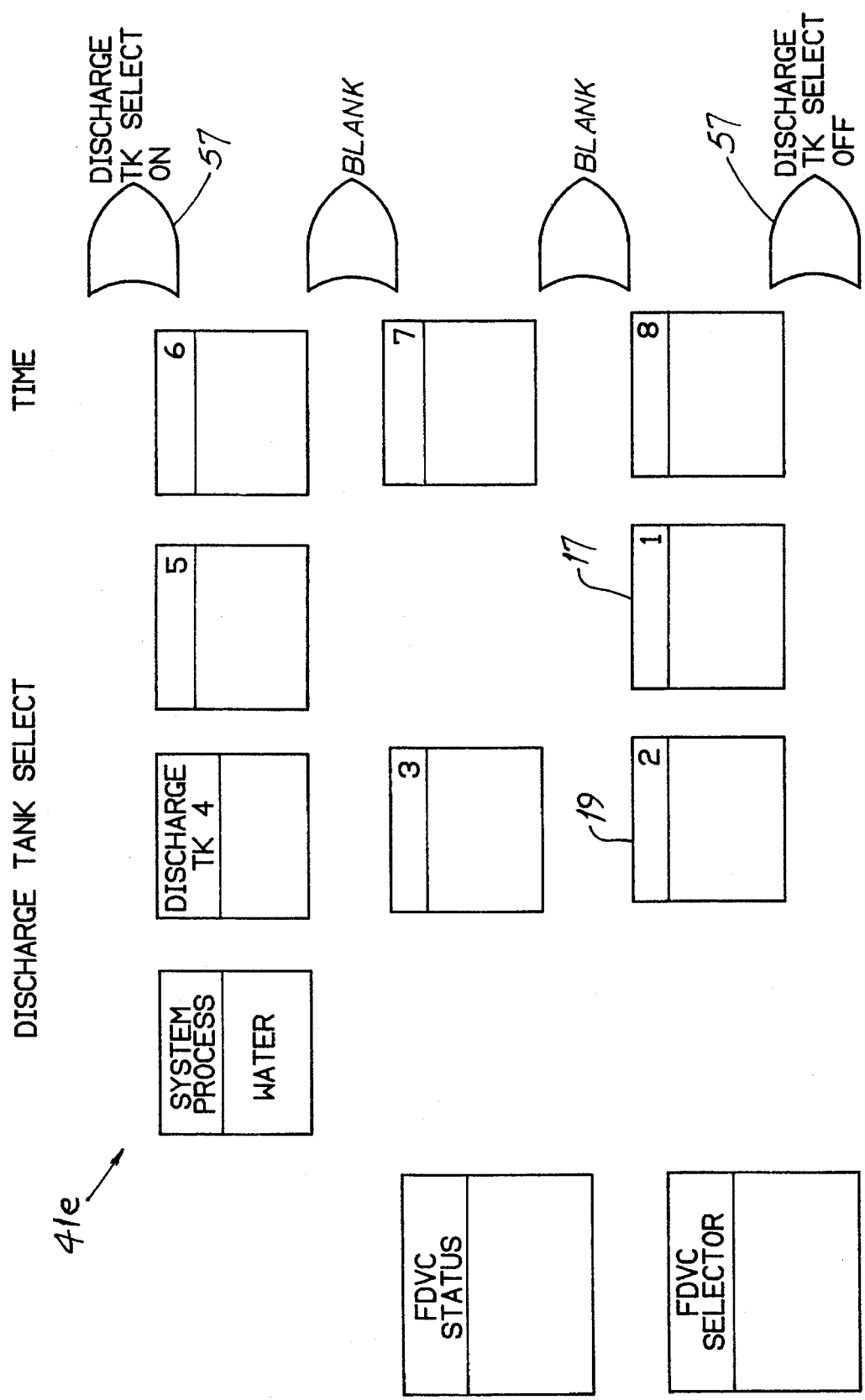
FIG. 7 is a panel displayed on the apparatus screen and relating to selection of the tank into which pasteurized chilled milk is discharged and stored.

Referring next to FIGS. 6 and 7, the system 11 includes plural product tanks including one or more raw product tanks 13, 15 and one or more discharge tanks 17, 19, the latter for receiving the pasteurized product. The panels 41d, 41e display identifying nomenclature for the tanks 13, 15, 17, 19 to permit tank selection using the displayed function keys.

(It is to be appreciated that the system 11 may have one or more raw milk tanks like tank 13 and one or more discharge or pasteurizing tanks like tank 17. The nomenclature "RAW TK 4," "DISCHARGE TK 4" and the like is to illustrate the multi-tank possibility.)

Figure 8:
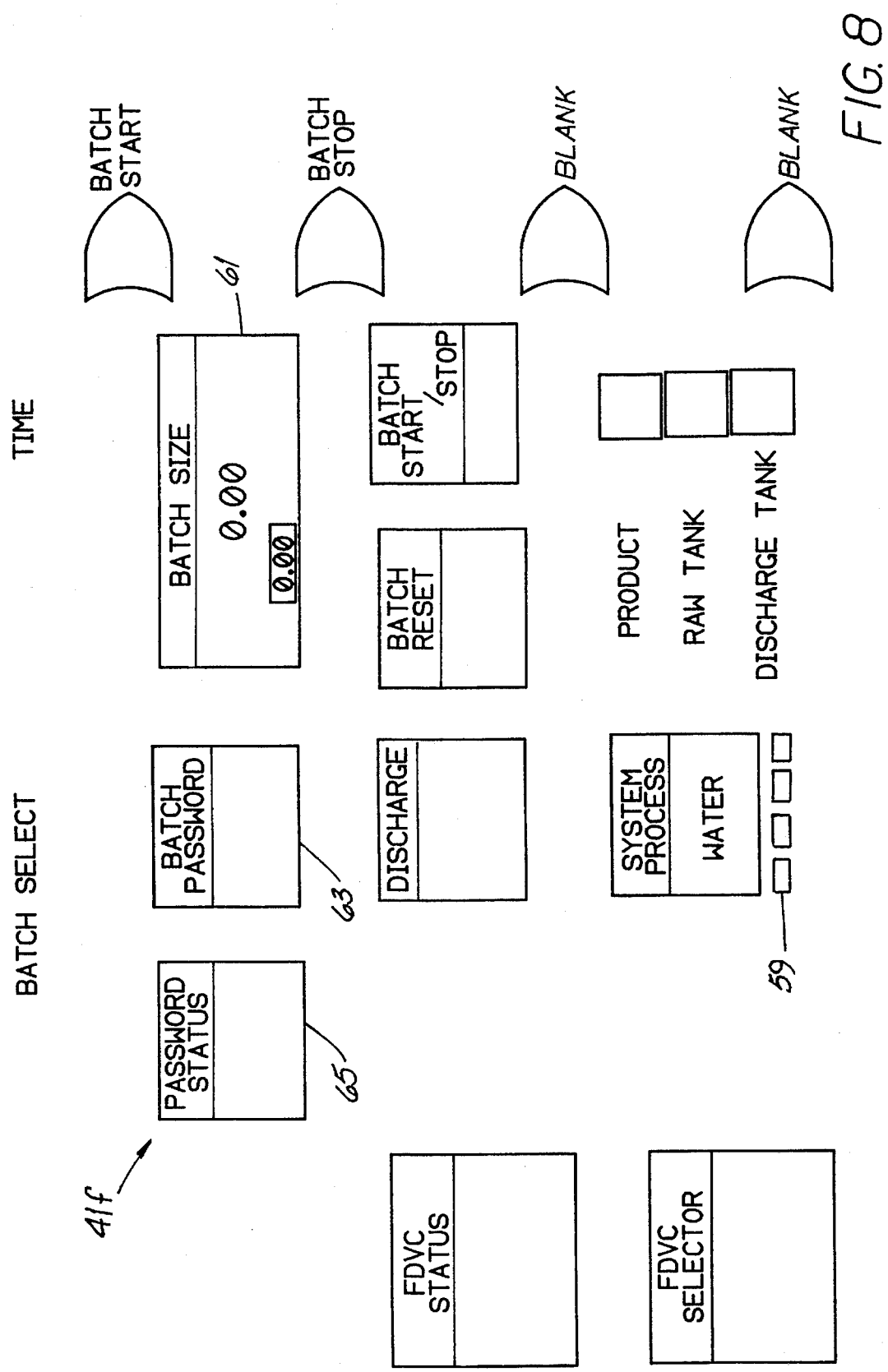
FIG. 8 is a panel displayed on the apparatus screen and relating to selection of the size of the "batch" of product to be pasteurized.

Referring next to FIG. 8, the system has the timing pump 47 and the milk product is pasteurized in a batch of, say, 2000 gallons, 16,000 pounds or the like. The buttons 59 related to batch size selection control operation of the timing pump 47 to select the size of the batch which appears in the "window" 61. That is, the pumping rate of the timing pump 47 is known and the batch size is selected by setting the batch size which automatically sets the length of time such pump 47 is to operate—thus, the name "timing pump."

It is to be appreciated that in one arrangement of the apparatus 10, the "setup" steps involving the panels 41a–41c of FIGS. 3–7, respectively, can be done by any person. However, pasteurization cannot actually start until the operator enters his or her unique "password" and such password is accepted as indicated in the window 63. And if the password is denied, (as indicated in the window 65) pasteurization will not start. (In practice, operators of milk pasteurizing systems 11 are well trained, notwithstanding that they may be able perform setup functions without entering a password. However, there is nothing to prevent the new apparatus 10 from being arranged so that an operator password must be accepted before any function can be initiated using the apparatus 10.)

And the new apparatus 10 is very easy to use. Referring next to FIG. 9, the depiction of the panel 41g relates to plural components and constitutes a graphic flow schematic or piping diagram 67 of the system 11. (The resemblance to the system 11 shown in FIG. 1 is very apparent.)

Such diagram 67 includes representations of each of the major pipes interconnecting components and through which product may flow. The pipes through which product is actually flowing, e.g., the pipes 37 and 69, are visually "highlighted" (by contrasting shading or the like) in the panel 41g so that the operator can see whether the intended operation is actually occurring.

Referring now to FIG. 10, the new apparatus 10 also facilitates what is known as the "clean-in-place" or CIP procedure. Such procedure (which is known per se) cleans and sterilizes the pipes 35, 37, 69 (as well as many others), the pumps and the other system components using hot water. The panel 41h, 47, 49 displays parameters relating to the CIP procedure including whether such procedure will run manually or automatically (parameter 71), the time remaining for the procedure to run (parameter 73) and the temperature set point (parameter 75) of the hot water used to carry out the CIP procedure. The function keys 77 are depressed to initiate and carry out such procedure.

Referring again to FIGS. 3–10 and particularly to FIG. 1, a preceding part of the specification describes the flow diversion device 31 and its importance in the overall operation of the system 11. Such flow diversion device 31 may be at either of two positions, i.e., "divert" or "forward." With the device in the "divert" position, the milk or other product is "looped back" along the pipe 79 to the input side of the system 11 and recycled through the heat exchanger 33. With the device 31 in the "forward" position, the pasteurized product is routed along the pipe 35 toward a discharge tank 17, 19. In a preferred apparatus 10, at least one panel e.g., panel 41a, also displays the position of the flow diversion device 31 and in a highly preferred embodiment, some or all of the panels 41a–41h display such position.

And that is not all. The new apparatus 10 also has a feature which largely eliminates the tedium and greater opportunity for inaccuracy attending manual record-keeping. Referring to FIG. 2, the new apparatus 10 also includes a batch report printer coupled to the logic controller 39. When the entirety of a batch has been processed (as signalled by a totalizer), a report on that batch is automatically printed on the printer 81. Preferably, the report includes the operator's password and other nomanclature identified to a particular operator.

Referring particularly to FIGS. 2 and 5, the new apparatus 10 also has a feature eliminating the need to manually add vitamin solution to tanks of milk product. Such apparatus 10 includes at least one vitamin solution dispenser (container and metering pump) coupled to the apparatus 10. When the panel 41c depicts the products from which a product selection is made, e.g., 2% milk as indicated by the window 85 to be pasteurized, such panel 41c also depicts a pad 87 for actuating the dispenser. Thereafter, such dispenser 83 "injects" vitamins into the milk product at a rate automatically selected in view of the particular milk product selected.

The invention also involves a method for controlling a system 11 used to pasteurize food products. Such method includes the steps of displaying a depiction relating to a component, e.g., the symbol of the timing pump 47 in FIG. 1 and operating an input device such as a button 51 in panel 41b controlling such component. In a more specific aspect, such method also includes the steps of pasteurizing a batch of a food product and printing a report relating to the batch. As noted above, the printing step is automatically initiated by the conclusion of the pasteurizing step.

It is preferred that a pasteurizing system 11 be operated only by skilled persons trained in its use. The new method helps assure that result. The pasteurizing step includes entering a "password" unique to a particular person and the operator of the pasteurizing system 11 will take steps to assure that only properly trained persons are accorded a password. The printing step includes printing nomenclature identifying the person whose password has been entered. Thus, the quantity, quality and process parameters (e.g., temperature out of the cooler 37) of every batch are identified to a particular operator.

In a preferred method, several system or product-related panels are displayed in sequence. That is, first, second, third and fourth panels 41, 41b, 41c and 41d, respectively, are displayed in sequence and first, second, third and fourth input devices or function keys 45, 51, 53 and 55, respectively, are sequentially selected. Most preferably, each panel 41a–41h also includes an input device related to that particular panel.

For example, the first panel 41a is related to the heat exchanger 33 and depicts a temperature bar graph 89 along with one or more input devices e.g., buttons 45, for selecting a temperature setpoint 43 for the liquid used to supply heat to the heat exchanger 33. As another example, another panel 41c may display identifying nomenclature, e.g., "skim", "2%", "1%", for each of the array of milk products which can be pasteurized in that system 11. Such panel 41c also includes one or more input devices, e.g., keys 53, for selecting (by nomenclature) a particular product to flow through the system 11.

As yet other examples, another panel 41d may include identifying nomenclature for the tanks, e.g., raw milk tank #1, and the operating step includes operating the function keys 55 to select a tank such as tank 13 or tank 15. Yet another panel 41f relates to batch size and the operating step includes operating another input button 59 (a device appearing on the batch size depiction) to select the size of the batch.

While only a few embodiments of the apparatus and variants of the method have been described herein, it is to be understood that such embodiments and variants are exemplary and not limiting.

What is claimed:

1. An apparatus for controlling a system used to pasteurize a food product, the system having components including at least one product tank, a pump connected by piping to the tank, to a flow diversion device and to a heat exchanger, the pump being identified by nomenclature and flowing a product through the system, the flow diversion device and the heat exchanger, and wherein the apparatus includes:

a programmable logic controller linked to the pump of the system being controlled;

a display panel connected to the apparatus and having (a) a depiction, and (b) an input device connected to the controller for controlling a component, and wherein the panel displays the nomenclature of the pump.

2. The apparatus of claim 1 wherein:

the depiction is a first depiction;

the heat exchanger is heated by a liquid flowing therethrough:

the display panel has a second depiction displayed after the first depiction which indicates the setpoint temperature of the liquid.

3. The apparatus of claim 1 wherein:

the product to be pasteurized by the system is selected from a group of milk products including skim milk and whole milk;

the products in the group are identified by nomenclature; and the panel displays the nomenclature for each of the products in the group.

4. The apparatus of claim 1 wherein:

the system includes plural product tanks;

each of the product tanks is identified by nomenclature; and the panel displays the nomenclature for the tanks.

5. The apparatus of claim 1 wherein:

the pump is a timing pump;

the food product is milk pasteurized in a batch; and the input device controls operation of the timing pump to select the size of the batch.

6. The apparatus of claim 1 wherein:

the depiction is of a piping diagram of the system;

the piping diagram includes plural pipes interconnecting components and through which product flows; and pipes through which product is flowing are visually emphasized in the depiction.

7. The apparatus of claim 1 wherein the flow diversion device may be at either of two positions and the panel also displays the position of the flow diversion device.

8. The apparatus of claim 6 wherein the flow diversion device may be at either of two positions and the panel also displays the position of the flow diversion device, 9. The apparatus of claim 1 wherein the food product is pasteurized in a batch and the apparatus further includes a batch report printer coupled to the logic controller, 10. The apparatus of claim 1 further including at least one vitamin solution dispenser coupled to the controller.

11. An apparatus for controlling a system used to pasteurize a food product, the system having components including at least one product tank, a pump connected by piping to the tank, to a flow diversion device and to a heat exchanger, and wherein the apparatus includes:

a programmable logic controller linked to the pump;

a display panel connected to the apparatus and having (a) a depiction, and (b) an input device connected to the controller for controlling a component;

and wherein:

the pump is identified by nomenclature; and the panel displays the nomenclature.

12. An apparatus for controlling a system used to pasteurize a food product, the system having components including at least one product tank, a pump connected by piping to the tank, to a flow diversion device and to a heat exchanger, and wherein the apparatus includes:

a programmable logic controller linked to the pump;

a display panel connected to the apparatus and having (a) a depiction, and (b) an input device connected to the controller for controlling a component;

and wherein:

the pump is a timing pump;

the food product is pasteurized in a batch; and the input device controls operation of the timing pump to select the size of the batch.

13. An apparatus for controlling a system used to pasteurize a food product selected from a group of milk products including skim milk and whole milk, the system having components including at least one product tank, a pump connected by piping to the tank, to a flow diversion device and to a heat exchanger, and wherein the apparatus includes:

a programmable logic controller linked to the pump;

a display panel connected to the apparatus and having (a) a depiction, and (b) an input device connected to the controller for controlling a component;

at least one vitamin solution dispenser coupled to the controller;

and wherein:

each of the products in the group is identified by nomenclature;

and the panel displays:

the nomenclature for each of the products in the group; and a pad for actuating the dispenser.

14. A method for controlling a system used to pasteurize food products, the system having components including at least one product tank, a pump for flowing a product through the system, a flow diversion device, a heat exchanger, the method including the steps of:

displaying a depiction of a component; and operating an input device controlling the depicted component;

entering a password unique to a particular operator of the system;

pasteurizing a batch of a food product; and printing a report relating to the batch including printing nomenclature identifying the operator.

15. An apparatus for controlling a system used to pasteurize a milk product in a batch, the system having components including at least one product tank, a timing pump connected by piping to the tank, to a flow diversion device and to a heat exchanger, the pump flowing a product through the system, the flow diversion device and the heat exchanger, and wherein the apparatus includes:

a programmable logic controller linked to at least one component of the system being controlled;

a display panel connected to the apparatus and having (a) a depiction, and (b) an input device connected to the controller for controlling the timing pump to select the size of the batch.

16. An apparatus for controlling a system used to pasteurize a food product in a batch, the system having components including at least one product tank, a pump connected by piping to the tank, to a flow diversion device and to a heat exchanger, the pump flowing a product through the system, the flow diversion device and the heat exchanger, and wherein the apparatus includes:

a batch report printer;

a programmable logic controller linked to the printer and to at least one component of the system being controlled;

a display panel connected to the apparatus and having (a) a depiction, and (b) an input device connected to the controller for controlling a component.

17. An apparatus for controlling a system used to pasteurize a food product, the system having components including at least one product tank, a pump connected by piping to the tank, to a flow diversion device and to a heat exchanger, the pump flowing a product through the system, the flow diversion device and the heat exchanger, and wherein the apparatus includes:

a vitamin solution dispenser;

a programmable logic controller linked to the dispenser and to at least one component of the system being controlled;

a display panel connected to the apparatus and having (a) a depiction, and (b) an input device connected to the controller for controlling a component.

18. The apparatus of claim 17 wherein:

the product to be pasteurized by the system is selected from a group of milk products including skim milk and whole milk;

the products in the group are identified by nomenclature, and wherein the panel displays:

nomenclature for each of the products in the group; and a pad for actuating the dispenser.

19. A method for controlling a system used to pasteurize food products, the system having components including at least one product tank, a pump for flowing a product through the system, a flow diversion device, a heat exchanger, the method including the steps of:

displaying a depiction of a component; and operating an input device controlling the depicted component;

pasteurizing a batch of a food product, the pasteurizing step including entering a password unique to a particular operator; and printing a report relating to the batch, the printing step including printing nomenclature identifying the operator.

20. The method of claim 19 wherein the printing step is automatically initiated by the conclusion of the pasteurizing step.

21. A method for controlling a system used to pasteurize food products, the system having components including at least one product tank, a pump for flowing a product through the system, a flow diversion device, a heat exchanger, the method including the steps of:

displaying a first depiction of a component;

operating a first input device controlling the component of the first depiction;

displaying a second depiction, a third depiction and a fourth depiction in sequence; and operating a second input device, a third input device and a fourth input device in sequence.

22. The method of claim 21 wherein the heat exchanger has heated liquid flowing therethrough, the first depiction indicates a set point temperature of the liquid and the first input device controls the setpoint temperature.

23. The method of claim 21 wherein (a) the food product to be pasteurized is selected from a group of milk products including whole milk and milk having reduced butterfat content, (b) the products in the group are identified by nomenclature, (c) the second depiction includes the nomenclature for each of the products in the group and the operating step includes:

operating the second input device to select the product to flow through the system.

24. The method of claim 21 wherein the system has plural product tanks, each of which is identified by nomenclature, the third depiction includes the nomenclature for the tanks and the operating step includes:

operating the third input device to select a tank.

25. The method of claim 21 wherein a milk product is pasteurized in a batch and the operating step includes:

operating the fourth input device to select the size of the batch.

* * * * *